United States Patent [19]

Battocchio

[11] Patent Number: 5,575,448

[45] Date of Patent: Nov. 19, 1996

[54] ADJUSTABLE STAND, PARTICULARY FOR PHOTOGRAPHIC AND CINEMATOGRAPHIC USE

[75] Inventor: Gilberto Battocchio, Bassano Del Grappa, Italy

[73] Assignee: Lino Manfrotto & Co. S.p.A., Bassano Del Grappa, Italy

[21] Appl. No.: 413,400

[22] Filed: Mar. 30, 1995

[30] Foreign Application Priority Data

Apr. 7, 1994 [IT] Italy .................... PD9400065

[51] Int. Cl.⁶ .................................. F16M 11/00
[52] U.S. Cl. .................. 248/410; 188/67; 248/636; 267/64.12
[58] Field of Search ................... 248/410, 562, 248/636, 132, 149, 161, 414, 157, 125.8, 188.5; 188/67, 284; 267/64.12, 284

[56] References Cited

U.S. PATENT DOCUMENTS 5,263,674  11/1993  Huang ........................ 267/64.12 X
5,425,526   6/1995  Shen ............................. 248/562 X Primary Examiner—Ramon O. Ramirez
Attorney, Agent, or Firm—Sughrue, Mion, Zinn, Macpeak & Seas

[57] ABSTRACT

An adjustable stand with a telescopic stem comprises a locking device for fixing the stem elements to one another firmly, the locking device including a collar which is connected to the first stem element and is automatically clamped onto the second element as a result of the load bearing on the second stem element.

8 Claims, 2 Drawing Sheets

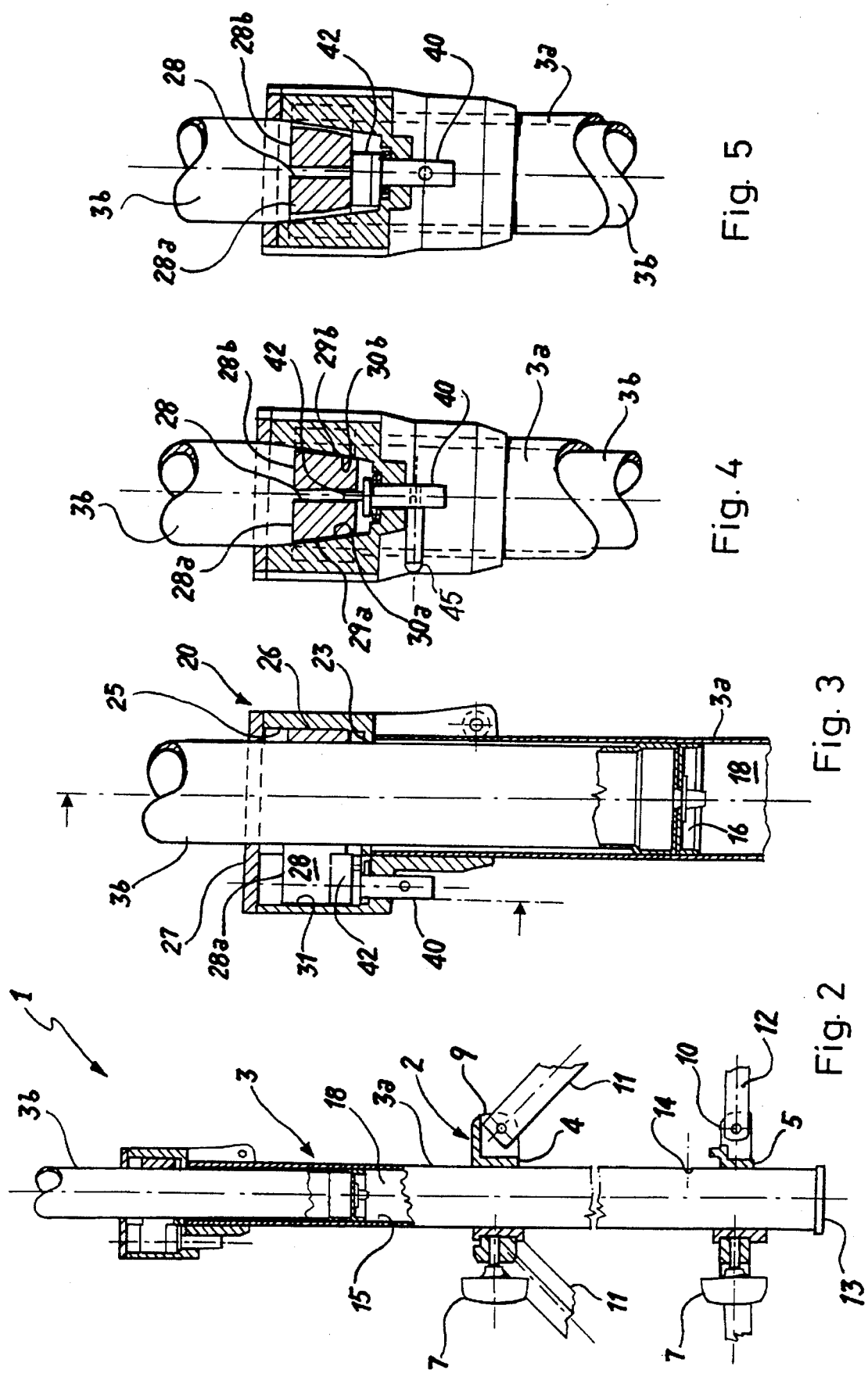

5,575,448

ADJUSTABLE STAND, PARTICULARY FOR PHOTOGRAPHIC AND CINEMATOGRAPHIC USE

BACKGROUND OF THE INVENTION

The present invention relates to an adjustable stand, particularly for photographic and cinematographic use but also suitable for use in the musical field and in furniture of the type comprising a telescopic stem with first and second stem elements which are slidable relative to one another, and with a locking device for firmly fixing the stem elements to one another, the locking device including a collar which is connected to the first element of the stem and surrounds the second element at least partially, as well as clamping means for the collar for tightening it from a inoperative position in which the second stem element is slidable relative to the first to an operative position in which the second stem element is fixed firmly to the first element by means of the collar.

Stands of the aforementioned type are widely known on the market; for example, tripods with collars which are clamped adjustably by screw clamping means like a conventional clamp are typical.

A main disadvantage of these stands lies in the need to operate the clamping means of the collar manually each time the sliding of the stem elements is to be locked or, conversely, unlocked in order to adjust the height of the stand.

Another example of solutions offered by the prior art is constituted by stands for photographic or cinematographic use which are marketed by the U.S. company Teledyne Industries, Inc.

The stands of this second example have devices for locking the sliding of the stem elements, based on the friction produced between the second stem element and a rubber-coated metal ring. A screw system enables the angle of intersection of the axes of the ring and of the stem elements to be adjusted so as to vary the friction between the second stem element and the ring. The optimal adjustment is achieved when the overall lead bearing on the second stem element is balanced by the aforesaid friction. Although the system is efficient, it is, however, quite dangerous in operation. In fact, it is subject to possible accidental loosening of the device for locking the stem. Anyone may thus, even inadvertently, loosen with a single hand the screw system which governs the positioning of the ring and consequently cause the second stem element to drop suddenly.

SUMMARY OF THE INVENTION

The problem upon which the invention is based ms that of providing a stand which is structurally and functionally designed to prevent the problems complained of with reference to the prior art cited.

The concept for the solution of this problem is based on the fact that the collar is rendered self-locking as a result of the lead bearing on the second stem element.

This concept is put into effect, according to the invention, in a stand of the type mentioned at the beginning, characterized in that the locking device comprises a seat in which the collar is restrained for limited movement between the inoperative position and the operative position, and in that the clamping means of the collar comprise respective surfaces of the collar and of the seat, the surfaces being coupled with one another and shaped so as to receive a component of the load bearing on the second stem element and to clamp the collar onto the second stem element in dependence on the said component.

BRIEF DESCRIPTION OF THE DRAWING

The characteristics and advantages of the invention will become clearer from the following detailed description of a preferred but not exclusive embodiment thereof, which is described by way of non-limiting example with reference to the appended drawings, in which:

FIG. 2 is a partial, sectioned, front elevational view of the stand of FIG. 1, FIG. 3 is a partially-sectioned front elevational view of a detail of the stand of FIG. 2, on an enlarged scale, FIGS. 4 and 5 are partially-sectioned side elevational views of the stand of the preceding drawings in the operative and inoperative positions, respectively.

DETAILED DESCRIPTION OF THE INVENTION

Figure 1:
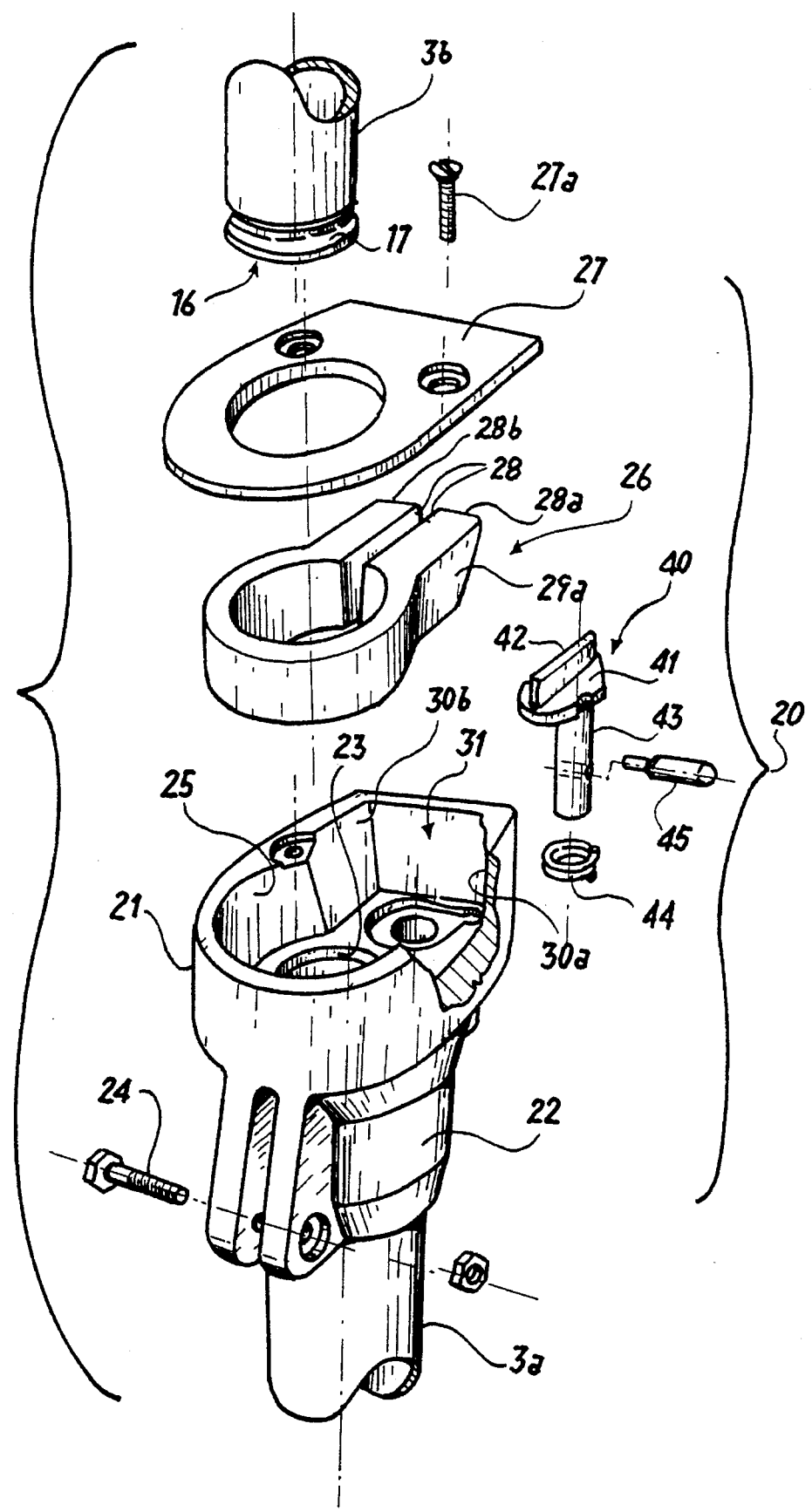
FIG. 1 is a partial, exploded, perspective view of a stand formed in accordance with the present invention.

In the drawings, a stand formed in accordance with the present invention is generally indicated 1. The stand 1 comprises a tripod, generally indicated 2, with a telescopic stem 3 connected adjustably thereto. The stem 3 in turn comprises first and second telescopically-associated stem elements 3a, 3b.

The tripod 2 comprises two annular elements 4, 5 which can be fixed in adjustable positions along the first element 3a of the stem 3. Each annular element is clamped onto the stem element 3a by means of a clamping device 7 of conventional structure, with a handgrip. The annular element 4 carries three pairs of flanges all indicated 9 and, similarly, the annular element 5 carries three pairs of flanges, all indicated 10. A respective leg 11 of the tripod is hinged between each pair of flanges 9; an end of a respective tie rod 12 is hinged between each pair of flanges 10, its opposite end being hinged on the corresponding leg 11. This configuration, which is shown only partially in FIG. 2 is conventional.

The first element 3a of the stem 3 is closed at the bottom, that is, at the opposite end to the second element 3b, by a plug 13 and has a small through-hole 14 in its own curved surface, near the plug.

The second element 3b of the stem 3 is inserted slidably in the first element 3a, sealingly engaging the internal wall 15 of the element 3a, at least during its downward travel towards the plug 13, by means of a lipped seal 16. The seal 16 is disc-shaped with a lip 17 which is turned over towards the plug 13 so as to perform the function of a one-way flap valve with respect to the wall 15, that is, to engage the wall sealingly during the downward travel of the element 3b towards the plug 13 and to permit the passage of air during its travel in the opposite direction to lengthen the stem 3. A chamber 18 is defined between the seal 16, the plug 13, and the corresponding portion of the wall 15. During the downward travel of the second stem element, the air trapped in the chamber 18 is thus forced to escape slowly to the exterior through the hole 14 exerting a damping effect between the two stem elements 3a, 3b, to brake the descent of the second element 3b, under load, into the first element 3a.

A locking device 20, disposed at the mouth of the first stem element 3a at the end axially opposite the plug is intended, when activated, to fix the elements of the stem 3 together firmly at least in the normal loading condition of the stem, which corresponds to a load applied to the second stem element and acting approximately towards the plug The locking device 20 comprises a cup-shaped body carrying a split-sleeve-shaped portion 22 which is fitted on the upper end of the stem element 3a, abutting the free end thereof by means of a shoulder 23. The sleeve-shaped portion 22 is clamped onto the stem element 3a so as to be fixed firmly thereto by means of a screw clamping system 24 or another similar system.

The cup-shaped body 21 defines a seat 25 in which a collar 26 is mounted with a limited capability for axial movement. A cover 27, fixed by means of screws 27a, closes the seat, restraining the collar 26 therein.

The collar 26 surrounds the second stem element 3b and is broken peripherally by a slot 28, by means of which the collar can be deformed resiliently radially and, in particular, can be contracted radially. Adjacent the slot 28, the collar carries two radially outwardly-projecting appendages 28a, 28b. These appendages 28a, 28b, have respective curved and tapered surfaces 29a, 29b disposed on opposite sides of the slot 28. The radius of curvature of the surfaces 29a, 29b is large in comparison with the geometrical dimensions of the surfaces so that they are approximately wedge-shaped. The curvature serves, however, to limit the contact area of these surfaces 29a, 29b with the homologous surfaces 30a, 30b of a housing 31 formed in the seat 25 for housing the appendages 28a, 28b. These surfaces 30a, 30b, on the other hand, are flat and are also oriented in a tapered arrangement so as to converge downwardly, that is, towards the plug 13 of the first element 3a of the stem 3.

The relative arrangement and the coupling between the surfaces 29a, 29b of the collar and the homologous surfaces 30a, 30b of the seat 25 bring about the clamping of the collar around the second element 3b of the stem 3 consequently locking the relative sliding of the stem elements, on account of an axial movement of the collar from an inoperative position (FIG. 5)—in which the second stem element 3b is slidable relative to the first element 3a—to the operative position of FIG. 4. For this reason, these surfaces 29a, 29b and 30a, 30b with the appendages 28a, 28b and the respective housing 31, are also indicated below by the expression: the clamping means for the collar.

When the collar has reached the operative position of FIG. 4, that is, when it is clamped around the second stem element 3, the clamping force for preventing further sliding of the second element 3b is achieved at the expense of a component of the load which bears on the second stem element and is received by the aforementioned tapered surfaces.

Finally, the locking device 20 comprises means 40 for restraining the collar 26 in the inoperative position of FIG. 5. The means 40 are disposed at the bottom of the housing 31 and comprise a plate 41 carrying a blade 42 which normally extends along the slot 28 in alignment therewith, so as not to interfere with the movement of the collar 26. The plate 41 is fixed firmly to a rod 43 which extends through the cup-shaped body 21 and is rotatable relative thereto. A spring 44 serves to restrain the plate 41 resiliently with the rod 43 and the blade 42 in the position of FIG. 4 so as to permit axial movement of the collar 26. A pin 45 is provided in the portion of the rod 43 which projects from the cup-shaped body 21 for rotating the plate 41 and the blade 42 to the position of FIG. 5 in which, since the blade 42 is disposed across the slot 28, it restrains the collar 26 in the inoperative position, preventing it from being clamped onto the element 3b of the stem 3.

When the vertical length of the stem 3 is to be adjusted, the second stem element 3b is gripped and urged outwardly from the first element so as to bring the collar 26 close to the cover 27 as indicated in FIG. 5. The rod 43 is then rotated so that the blade 42 is disposed across the slot 28 between the appendages 28a, 28b. When the collar-restraint means 40 are in this position, the two elements of the stem 3 can slide freely relative to one another. It will be noted that, in this condition, the second stem element is braked in its downward travel towards the plug 13 by the damping function described above.

When the desired position is reached, or when it is wished to change from a retracted condition of the stem to a more extended condition, the rod 43 of the means 40 is released so that the blade 42 returns into alignment with the slot 28 and thus does not obstruct the movement of the collar 26.

If the second stem element 3b is released, it descends towards the first stem element 3a, because of the load bearing on it, moving the collar 26 downwards with it. This downward movement is stopped immediately, however, by the self-locking effect of the locking device 20. In fact, as soon as the mutual contact between the respective surfaces 29a, 29b and 20a, 20b of the collar 26 and of the seat 25 causes the collar to be clamped onto the second stem element 3b, its downward travel is braked.

The main advantage achieved by the stand of the invention consists of the structural simplicity and reliability of the self-locking system which governs the adjustment of the length of the telescopic stem.

Moreover, all the adjustments which tend to lengthen the stem can be carried out with one hand only, simply by pulling the second stem element out to the desired extent, whilst operations involving a reduction of the stem, that is, a lowering of the second stem element into the first, require deliberateness which prevents any accidental operation.

What is claimed is:

1. An adjustable stand, particularly for photographic and cinematographic use, comprising a telescopic stem with first and second stem elements which are slidable relative to one another, and with a locking device for firmly fixing the stem elements to one another, the locking device including a collar which is connected to the first element of the stem and surrounds the second element at least partially, as well as clamping means for the collar for tightening it from an inoperative position in which the second stem element is slidable relative to the first to an operative position in which the second stem element is fixed firmly to the first element by means of the collar, characterized in that the locking device comprises a seat in which the collar is restrained for limited movement between the inoperative position and the operative position, and in that the clamping means for the collar comprise respective surfaces of the collar and of the seat, the surfaces being coupled with one another and shaped so as to receive a component of a load bearing on the second stem element and to clamp the collar onto the second stem dement in dependence on the said component.

2. A stand according to claim 1, in which the surfaces of the collar and/or of the seat are tapered.

3. A stand according to claim 2, in which the clamping means comprise two appendages extending radially from the collar adjacent a break in the periphery thereof, the seat having a housing in which the appendages are housed, the tapered surfaces being formed on homologous surfaces of the housing and of the appendages.

4. A stand according ho claim 3, in which the tapered surfaces of the housing are essentially flat and the tapered surfaces of the appendages are essentially curved.

5. A stand according to claim 3, in which the locking device comprises means for restraining the collar in the inoperative position.

6. A stand according to claim 5, in which the means for restraining the collar comprise a blade which is movable in the locking device between a first position in which it interferes with the appendages, preventing the movement of the collar to the operative position and a second position in which it does not interfere with the appendages, releasing the movement of the collar.

7. A stand according to claim 1, in which the stem comprises a damping device which is active between the stem elements to brake their relative sliding.

8. A stand according to claim 7, in which the damping device comprises a calibrated through-hole in the first stem element, and a seal on the second stem element, the seal engaging sealingly an internal curved surface of the first element and defining an air chamber in the first element and a one-way valve which is normally closed and can admit air to the chamber only during a lengthening travel of the stem.

* * * * *